No. 621,151. Patented Mar. 14, 1899.
J. A. SCHARWATH.
PIPE COVERING.
(Application filed Sept. 8, 1898.)
(No Model.)
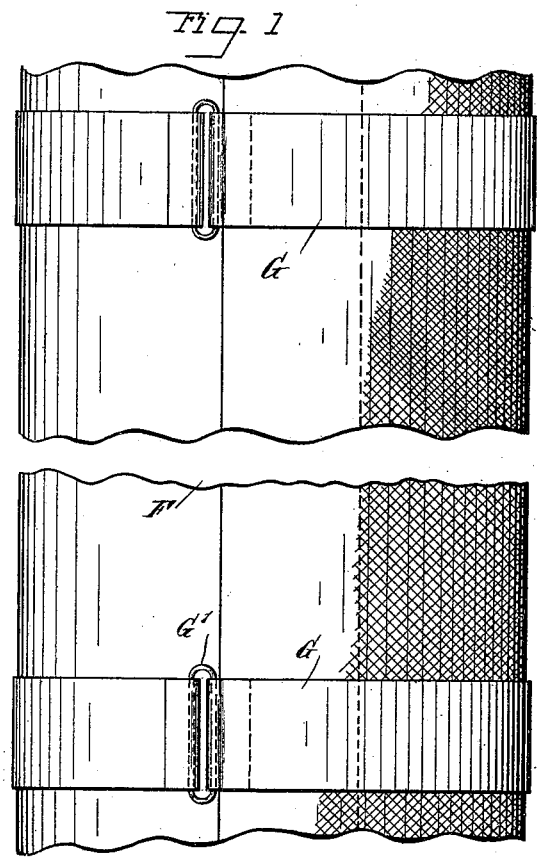
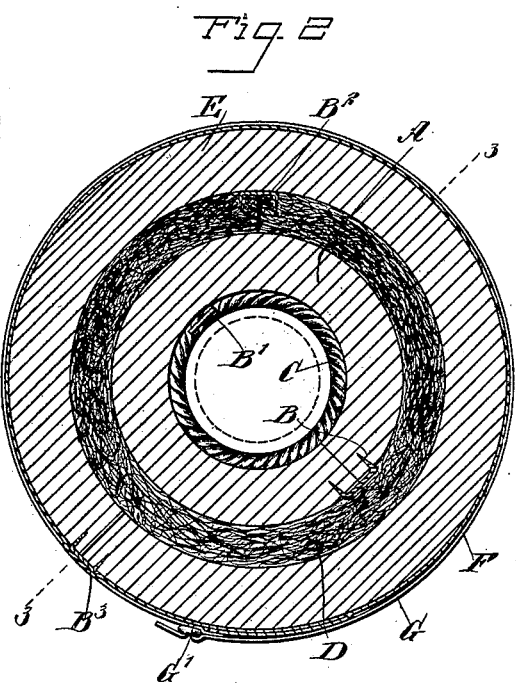
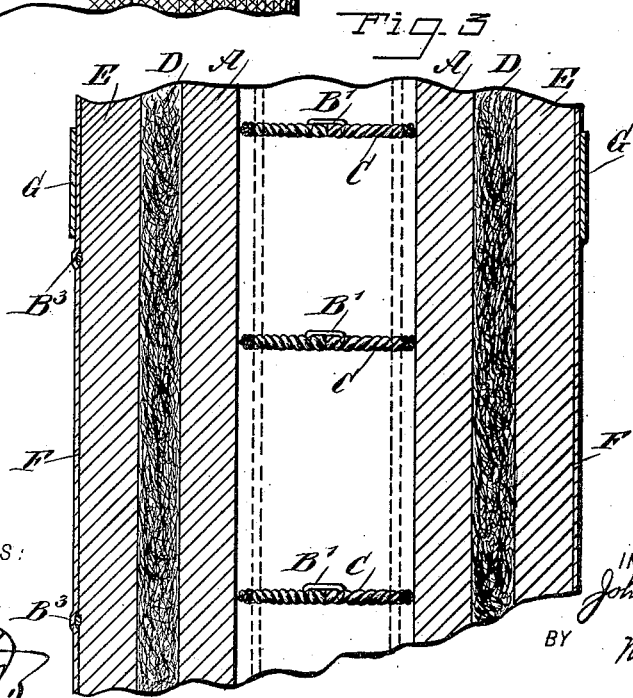
WITNESSES:
INVENTOR
John A. Scharwath.
BY
ATTORNEYS.

UNITED STATES PATENT OFFICE.

JOHN ANDREW SCHARWATH, OF JERSEY CITY, NEW JERSEY.

PIPE-COVERING.

SPECIFICATION forming part of Letters Patent No. 621,151, dated March 14, 1899.

Application filed September 8, 1898. Serial No. 690,505. (No model.)

*To all whom it may concern:*

Be it known that I, JOHN ANDREW SCHARWATH, of Jersey City, in the county of Hudson and State of New Jersey, have invented a new and Improved Pipe-Covering, of which the following is a full, clear, and exact description.

The object of the invention is to provide a new and improved covering or insulation which is simple and durable in construction, arranged for convenient application, and more especially designed for use on pipes through which passes ammonia, brine, or like cooling fluid used for refrigerating, ice-making, and other purposes.

The invention consists of novel features and parts and combinations of the same, as will be fully described hereinafter and then pointed out in the claim.

Reference is to be had to the accompanying drawings, forming a part of this specification, in which similar characters of reference indicate corresponding parts in all the figures.

Figure 1 is a side elevation of the improvement. Fig. 2 is a sectional plan view of the same, and Fig. 3 is a sectional elevation of the same on the line 3 3 in Fig. 2.

The improved pipe covering or insulation is provided with a moisture-proof tube A of any desired length or thickness, preferably constructed of wool felt, tar-paper, or other paper saturated with tar, asphalt, or other waterproofing material and split longitudinally to permit of conveniently opening the tube and passing it over the pipe to be covered or insulated. The abutting edges of the tube are preferably coated with an asphaltic gum or other suitable waterproofing material, said seam or abutting edges being then fastened together by staples B or other suitable fastening devices.

Inside of the tube A and placed a suitable distance apart on the pipe to be covered or insulated are arranged rings C, surrounding the pipe and forming a dead-air space between the exterior surface of the pipe and the interior surface of the moisture-proof tube A. The rings C are preferably split to enable them to be conveniently passed upon the pipe, the abutting ends of the rings being then fastened together by staples B' or other suitable fastening devices.

The moisture-proof tube A is surrounded by a layer of felt or other suitable insulating material D, made tubular in form and split longitudinally to enable the material D to be passed around the tube A, the abutting edges of said material being fastened together by staples $B^2$ or other suitable fastening devices. The material D is inclosed within a tube E, similar in construction to and preferably of the same material as the tube A, the abutting edges of said tube E being fastened together by staples $B^3$ or other suitable fastening devices. The tube E is covered and inclosed by a fabric material F, the edges of which are overlapped and fastened together by glue or other suitable adhesive or binding substance.

The abutting edges of the tube E are preferably coated with an asphaltic gum or other suitable waterproofing material.

In order to securely hold the several parts of the pipe covering or insulation firmly in position, I provide metallic bands G, passed at intervals around the fabric F, each of said bands being provided at one end with a loop or eye G', adapted to be engaged by the other end of the band and doubled over after having been drawn tight, as will be readily understood by reference to Figs. 1 and 2.

It will be seen that by the arrangement shown and described the pipe through which the ammonia, brine, or other cooling medium passes is completely protected against the heat and moisture of the atmosphere, and consequently no frost forms on the external surface of the pipe and very little, if any, cold is lost from the cooling medium during its passage through the pipe.

Having thus described my invention, I claim as new and desire to secure by Letters Patent—

In a pipe-covering, the combination of a plurality of separate split rings adapted to engage directly with the exterior surface of the pipe, staples serving to fasten together contiguous ends of the rings, whereby to secure the rings on the pipe, a moisture-proof tube split longitudinally and surrounding the rings, staples serving to fasten the engaging edges of the tube, such edges being sealed together by an asphaltum gum, a layer of insulating material surrounding the moisture-proof tube and split longitudinally, staples for securing the edges of the insulating material together, an additional tube surrounding the insulating material and similar to the first-named tube, and metallic bands encircling the last-named tube and serving to strap together the entire structure.

JOHN ANDREW SCHARWATH.

Witnesses:
 EVERARD BOLTON MARSHALL,
 F. W. HANAFORD.